M. WOOLF.
OPTICAL INSTRUMENT.
APPLICATION FILED APR. 1, 1920.
1,432,821.
Patented Oct. 24, 1922.
3 SHEETS—SHEET 1.
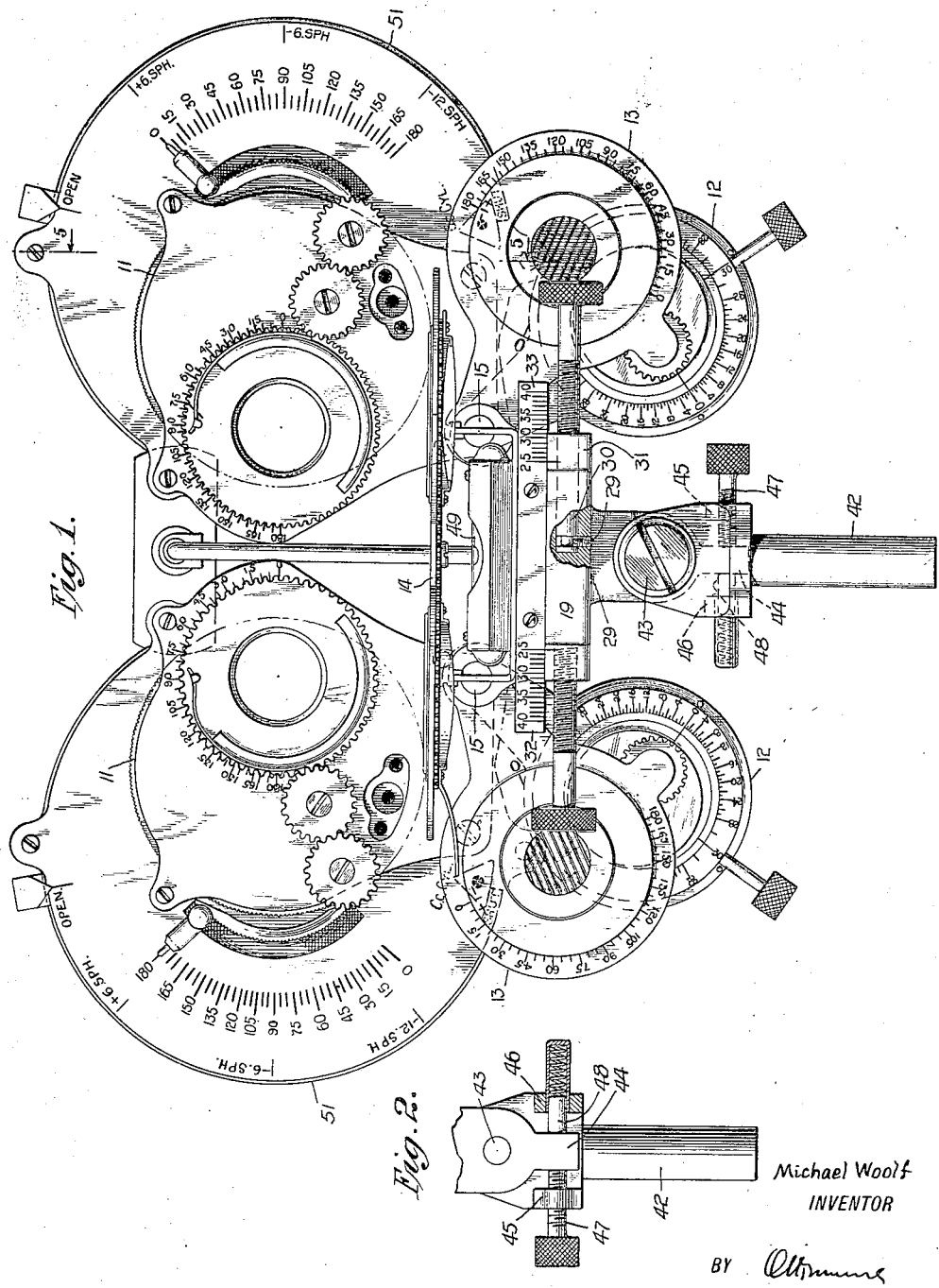
Michael Woolf
INVENTOR
BY *(signature)*
ATTORNEY

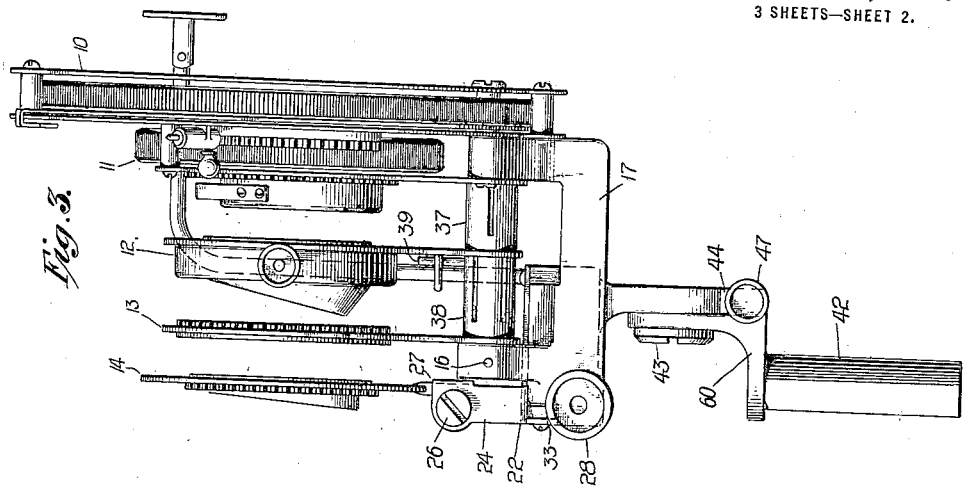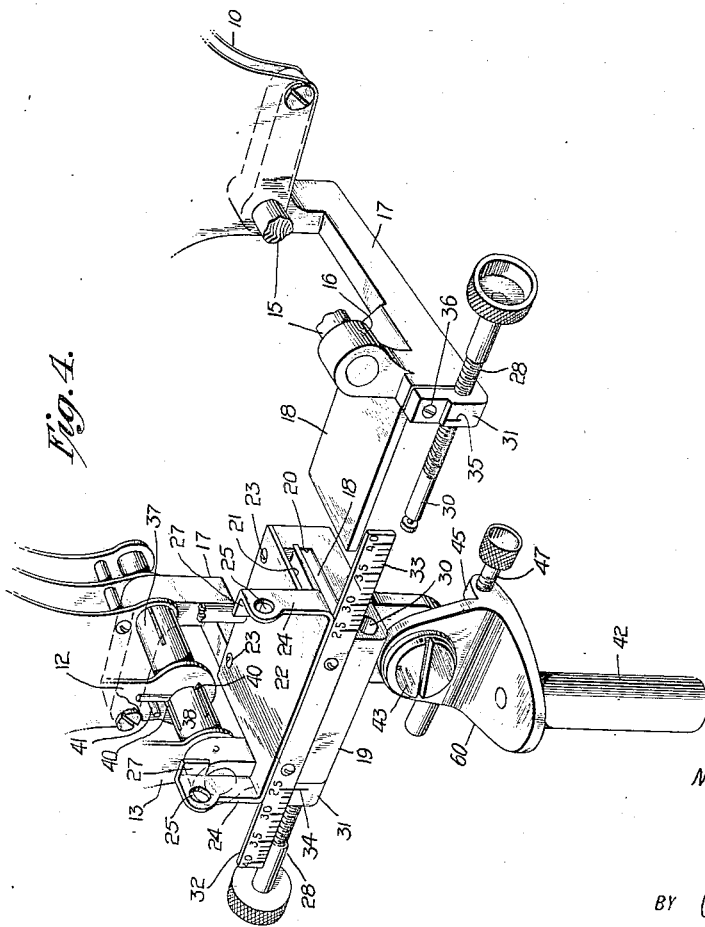

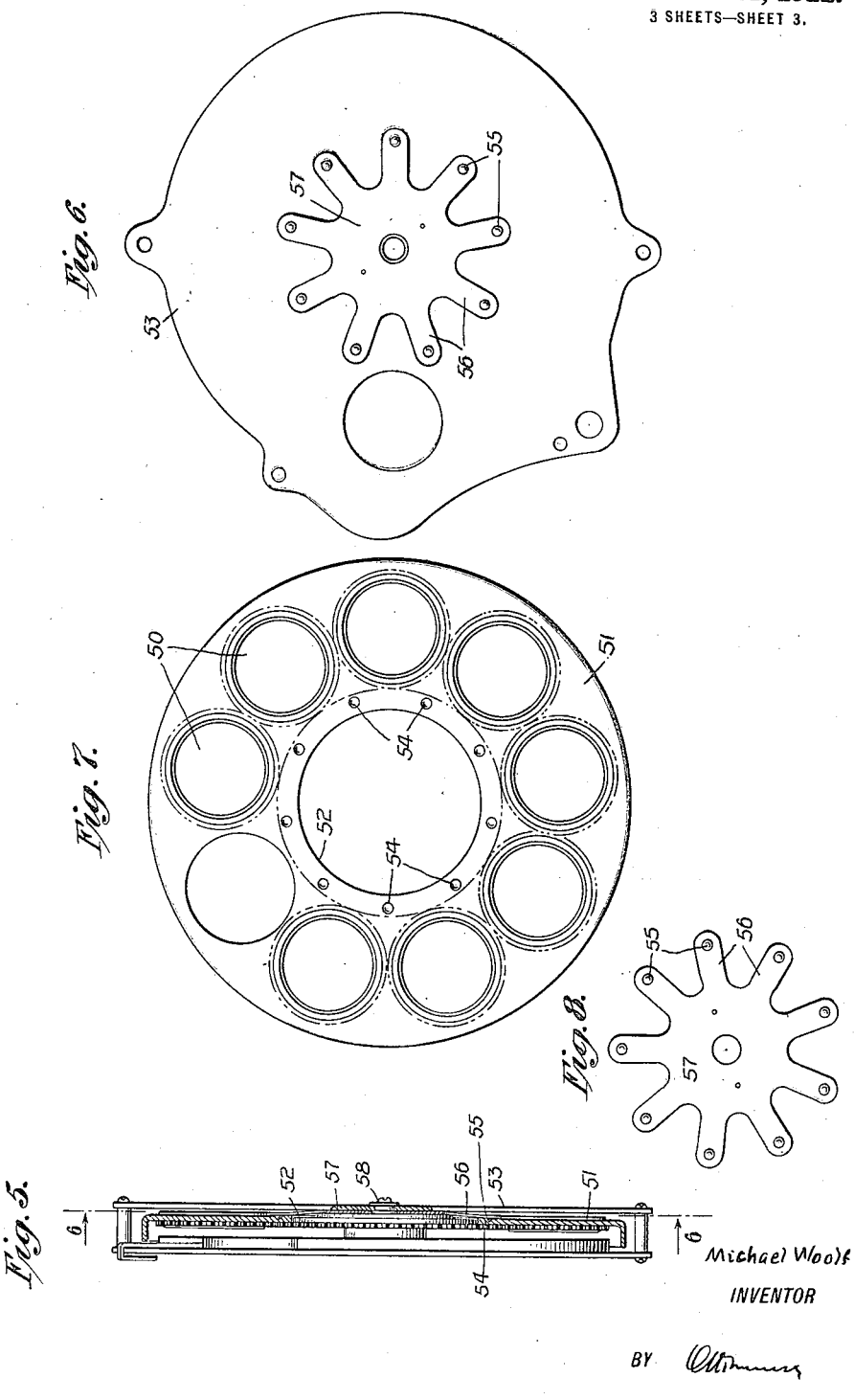

Patented Oct. 24, 1922.

1,432,821

UNITED STATES PATENT OFFICE.

MICHAEL WOOLF, OF NEW YORK, N. Y.

OPTICAL INSTRUMENT.

Application filed April 1, 1920. Serial No. 370,371.

*To all whom it may concern:*

Be it known that I, MICHAEL WOOLF, a citizen of the United States, residing at New York city, in the county and State of New York, have invented certain new and useful Improvements in Optical Instruments, of which the following is a specification.

This invention relates particularly to instruments of the character disclosed in my Patent 1,240,289 and has for its main objects to improve and to increase the sphere of usefulness of such instruments.

Other objects of the invention are to facilitate interchangeability of different lens holders and to enable rapid and accurate pupilary adjustment.

The invention involves various novel features of construction, combinations, relations and arrangements of parts, as will appear in the course of the following specification, reference being had to the accompanying drawings wherein I have illustrated the invention embodied in but one of its practical, commercial forms.

In the drawings referred to, Figure 1 is a front elevation of the complete device, a portion of the supporting head being indicated as broken away and in section for the purpose of showing the mounting of the pupilary adjusting screws.

Figure 2 is a broken detail view of the leveling mechanism for the head.

Figure 3 is a side elevation of the instrument.

Figure 4 is a broken and partly sectional view of the supporting head and sliding lens carriers.

Figure 5 is a vertical sectional view of the cylindrical lens system as taken on substantially the plane of line 5—5 of Figure 1.

Figure 6 is a view of the back plate of this system as taken on substantially the plane of line 6—6 of Figure 5.

Figure 7 is a back view of the rotatable lens mount.

Figure 8 is a detached detail view of the spring member for holding the lens mount in its rotatably adjusted position.

In the instrument disclosed, I have utilized features of my patent above referred to, including the cylindrical lens system 10 and the spherical lens system 11 which is superimposed upon the same. In addition to these lens systems I have indicated other lens mounts 12, 13 and 14 arranged, as shown in Figure 3, in successive superimposed relation.

A special feature of the superimposed lens holders 10, 11, 12 and 13 is that they are all supported on a common axis about which they are independently adjustable so that each, or any of them, can be thrown into or out of the optical axis.

This concentric mounting of the lenses will probably be most easily understood from Figure 4, wherein I have shown each set of the lens holders referred to as mounted on a common supporting shaft or arbor 15, which is shown as secured fast by means of a pin 16 in a supporting bracket 17, the construction described being duplicated for both eyes.

Pupilary adjustment of the two sets of independently adjustable lens holders is obtained in my invention by mounting each of the supporting brackets 17 on the end of a slide 18 which operates in a guide-way provided therefor in the supporting head 19. The guiding passages for these two slides are indicated at 20 and 21 in Figure 4, said passages being open to the opposite sides of the head and being shown in this disclosure as arranged one above the other.

The upper guide passage 21 is illustrated as formed by an open cut made in the top of the supporting head and closed over by a cover plate 22 which may be secured in place by means of screws 23, and which is shown as utilized as a support for the lens holder 14 by providing it at its forward edge with the upstanding lugs or ears 24 having bearings 25 receiving the pivot screws 26 of the lens holder. These ears are furthermore shown as formed with the angular inturned lugs 27 providing stops for limiting the upthrow of the lens holder 14.

The slides 18 are preferably made rectangular in shape and relatively long and wide, as indicated, so as to have a firm, non-binding bearing in the supporting head. The adjustment of these lens carrying slides is obtained in the construction illustrated by means of the independently adjustable thumb screws 28 held at their inner ends by means of the set screws 29 (Fig. 1) in the bores 30 provided in the head and engaging with their screw-threaded portions, screw seats formed in the forward ends 31 of the brackets 17. These forward ends of the brackets constitute stop shoulders or abutments engaging with the sides of the head to limit the inward adjustment of the slides.

The slidable lens carriers are, by the means described, independently adjustable and to facilitate and to make possible accurate adjustment of these parts, I have shown the supporting head as provided with the oppositely extending scales 32, 33 with which are arranged to register the pointers or indicators 34 and 35 on the abutments 31 of the two slides, said abutments being indicated as relieved or cut back at 36 to receive said scales.

The several lenses in each set may be of any desired optical design or construction and may be arranged in special order to meet different requirements and having in mind the provision of lenses of different desired types, in each set, it will be seen that any one or all of them may be interchanged and shifted into and out of the optical axes by simply turning them about their common axes of support. In Figure 1, for instance, I have shown the cylindrical and spherical lens systems as turned up in position for use and the lens holders 12 and 13 as turned down into inoperative positions. Also in this view I have illustrated the first lens holder 14 as turned downward on its pivot and hence in its inoperative position, this latter holder turning down on fixed pivots disposed substantially at right angles to the other supporting axes 15.

For the purpose of yieldingly securing lens holders 12 and 13 in the positions to which they are adjusted, I have indicated the same as supported on the arbors 15 by means of the split frictional clamping sleeves 37 and 38 and for the purpose of accurately setting these lens holders in the operative position, I have illustrated cooperating stops in the form of stop pins 39 upstanding from the supporting arbors and arranged to be engaged by stop shoulders 40 on the sleeve 38 or by a stop pin 41 projecting from the face of the lens holder 12. The stop shoulders 40 for the lens holder 13 are indicated as formed by cutting away an arcuate portion at the end of the sleeve 38 which shoulders serve to limit the throw of the lens holder 13 in both directions. The stop shoulder provided by the pin 41 on the other hand may limit the throw of the lens holder 14 only in the upward direction.

The supporting head is usually pivotally supported on a post 42, the pivot being indicated at 43. For the purpose of leveling the head I have shown the same as provided with a dependent lug 44 projecting below the pivotal center and in between a pair of opposed spaced lugs 45, 46 on the post, the first of which carries an adjusting thumb screw 47 and the other of which carries a spring-pressed plunger 48, said screw and plunger engaging the dependent lug 44 at opposite sides, so that by simply adjusting the thumb screw the head may be rocked or tilted in either direction. The head is furthermore shown as provided with a spirit level 49 which enables the head to be accurately adjusted.

The lenses of the cylindrical system are arranged in a circular series as indicated particularly at 50 in Figure 7, in a rotatable carrier or wheel 51 which is journaled at its center at 52 on the supporting back plate 53. For the purpose of accurately and firmly securing the rotatable carrier in the position to which it is adjusted, I have shown it as provided with a number of seats or recesses 54 about the inner periphery thereof and substantially corresponding in number and position to the lenses on the carrier, said seats being engaged by the projections or protuberances 55 on the ends of the radiating spring fingers 56 carried by the holding disc 57 which is secured at 58 to the back plate 53.

From the foregoing it will be seen that the invention provides a ready means for quickly and accurately performing various tests and for determining the nature of lenses required.

In order to balance the head and the parts supported thereby, I prefer to mount the pivot 43 for such head on a bracket 60 extending laterally from the top of the post 42, as indicated particularly in Figures 3 and 4. This balances the head and overcomes to a large extent the tendency for the head to tilt backwardly or forwardly.

What I claim is:

1. An optical instrument comprising a supporting head having superposed lateral passages, slides operating in said passages, a separate screw for adjusting each of said slides independently of the other, arbors supported at the outer ends of said slides and independently adjustable lens carriers pivotally mounted on said arbors.

2. In an optical instrument, pupilarily adjustable arbors, a plurality of superimposed lens mounts pivotally engaged on each of said arbors and frictional gripping means carried by the individual lens mounts and yieldingly engaging the supporting arbor to frictionally retain the same in adjusted relation.

3. In an optical instrument, pupilarily adjustable arbors, a plurality of superimposed lens mounts pivotally engaged on each of said arbors, frictional gripping means carried by the individual lens mounts and yieldingly engaging the supporting arbor to frictionally retain the same in adjusted relation and stops for limiting the pivotal movement of the lens mounts on the arbors.

4. In an optical instrument, pupilarily adjustable arbors, a plurality of superimposed lens mounts pivotally engaged on each of said arbors, frictional gripping means carried by the individual lens mounts and yieldingly engaging the supporting arbor to frictionally retain the same in adjusted relation, stops for limiting the pivotal movement of the lens mounts on the arbors and comprising pins projecting from the arbors and shoulders carried by the lens mounts for engagement with such pins.

5. An optical instrument comprising a head provided with lateral superposed passages open to opposite sides of the head, oppositely extensible slides operating in said passages and provided with stop abutments for engagement with the sides of the head, adjusting screws engaged with the head at opposite sides thereof and with each of said stop abutments to independently shift the slides for pupilary adjustment and lens carriers mounted on the slides.

6. An optical instrument comprising a head provided with lateral passages open to opposite sides of the head, slides operating in said passages and provided with stop abutments for engagement with the sides of the head, adjusting screws engaged with the head and with said stop abutments to shift the slides for pupilary adjustment, lens carriers mounted on the slides, scales extending from the opposite sides of the supporting head and indicators on the stop abutments registering with said scales.

7. An optical instrument comprising a supporting head provided with a guide passage in the top thereof, a plate secured to the head over said guide passage and provided with upstanding lugs, a lens mount pivoted in said lugs and a lens carrier slidably engaged in the guide passage beneath said plate.

8. An optical instrument comprising a supporting head provided with a guide passage therein, a laterally adjustable slide mounted in said passage, and extensible axially thereof, an arbor carried by said slide and provided with upright brackets and a plurality of superimposed independently adjustable lens carriers pivotally engaged between said brackets.

9. An optical instrument comprising a supporting head having a rectangular guide passage therein, a laterally adjustable slide mounted in said passage and extensible axially thereof, an arbor carried on the free end of said slide and provided with upright brackets, a plurality of superimposed independently adjustable lens carriers pivotally engaged between said brackets and means for normally yieldingly securing said lens carriers in independently adjusted relation.

10. In an optical instrument, a post provided with opposed spaced lugs, a screw engaged in one of said lugs, a spring-pressed plunger supported in the other lug and opposed to said screw, a head pivoted on said post and provided with a lug standing between the spring-pressed plunger and screw, pupilarily adjustable carriers mounted on the head and a set of independently adjustable lens mounts supported on a common axis on each of said carriers.

In testimony whereof I have affixed my signature in presence of two witnesses.

MICHAEL WOOLF.

Witnesses:
    HUGO L. WINTNER,
    EMANUEL WOOLF.